(12) United States Patent
Piras et al.

(10) Patent No.: US 12,514,254 B2
(45) Date of Patent: Jan. 6, 2026

(54) ROSA CANINA ROSEHIP

(71) Applicant: UNIVERSITA' DEGLI STUDI DI CAGLIARI, Cagliari (IT)

(72) Inventors: Alessandra Piras, Cagliari (IT); Antonella Ibba, Cagliari (IT); Germano Orru', Cagliari (IT); Silvia Porcedda, Cagliari (IT)

(73) Assignee: UNIVERSITA' DEGLI STUDI DI CAGLIARI, Cagliari (IT)

( * ) Notice: Subject to any disclaimer, the term of this patent is extended or adjusted under 35 U.S.C. 154(b) by 453 days.

(21) Appl. No.: 18/258,827

(22) PCT Filed: Dec. 22, 2020

(86) PCT No.: PCT/IB2020/062317
§ 371 (c)(1),
(2) Date: Jun. 22, 2023

(87) PCT Pub. No.: WO2022/136907
PCT Pub. Date: Jun. 30, 2022

(65) Prior Publication Data
US 2024/0041054 A1 Feb. 8, 2024

(51) Int. Cl.
*A01N 65/34* (2009.01)
*A01N 25/04* (2006.01)
(Continued)

(52) U.S. Cl.
CPC .............. *A01N 65/34* (2013.01); *A01N 25/04* (2013.01); *A01N 31/04* (2013.01); *A01N 31/16* (2013.01); *A01N 37/02* (2013.01); *A01N 37/06* (2013.01); *A01N 37/08* (2013.01); *A01N 43/30* (2013.01); *A01P 1/00* (2021.08); *A01P 3/00* (2021.08); *A61K 8/34* (2013.01); *A61K 8/347* (2013.01); *A61K 8/36* (2013.01); *A61K 8/361* (2013.01); *A61K 8/37* (2013.01); *A61K 8/4973* (2013.01);
(Continued)

(58) Field of Classification Search
None
See application file for complete search history.

(56) References Cited

FOREIGN PATENT DOCUMENTS

| EP | 3120712 A1 | 1/2017 |
|---|---|---|
| WO | 2009080778 A2 | 7/2009 |

OTHER PUBLICATIONS

Szentmihályi, K., et al., Rose hip (*Rosa canina* L.) oil obtained from waste hip seeds by different extraction methods, Bioresour. Technol., 82 (Apr. 2002) pp. 195-201. (Year: 2002).*

(Continued)

*Primary Examiner* — Dominic Lazaro
(74) *Attorney, Agent, or Firm* — Bayramoglu Law Offices LLC

(57) ABSTRACT

A natural extract from seeds of Rosa canina which has a high antimicrobial activity is provided. The extract, which is diluted in water at different concentrations, constitutes an antimicrobial solution used in various fields: in environmental disinfection, both in humans and animals, as a base for antibacterial/antifungal preparations for topical, cutaneous or mucosal use. The extract is used in the preparation of disinfectant solutions that are used in the outpatient, hospital and domestic field, for air conditioner filters and for environments used for the preparation of food, as an ingredient in mouthwashes, toothpastes and skin creams.

37 Claims, 5 Drawing Sheets

(51) Int. Cl.

| | | |
|---|---|---|
| A01N 31/04 | (2006.01) | |
| A01N 31/16 | (2006.01) | |
| A01N 37/02 | (2006.01) | |
| A01N 37/06 | (2006.01) | |
| A01N 37/08 | (2006.01) | |
| A01N 43/30 | (2006.01) | |
| A01P 1/00 | (2006.01) | |
| A01P 3/00 | (2006.01) | |
| A61K 8/34 | (2006.01) | |
| A61K 8/36 | (2006.01) | |
| A61K 8/37 | (2006.01) | |
| A61K 8/49 | (2006.01) | |
| A61K 8/9789 | (2017.01) | |
| A61K 31/05 | (2006.01) | |
| A61K 31/085 | (2006.01) | |
| A61K 31/19 | (2006.01) | |
| A61K 31/20 | (2006.01) | |
| A61K 31/201 | (2006.01) | |
| A61K 31/202 | (2006.01) | |
| A61K 31/23 | (2006.01) | |
| A61K 31/231 | (2006.01) | |
| A61K 31/232 | (2006.01) | |
| A61K 31/357 | (2006.01) | |
| A61K 36/738 | (2006.01) | |
| A61P 1/00 | (2006.01) | |
| A61P 3/00 | (2006.01) | |
| A61Q 17/00 | (2006.01) | |

(52) U.S. Cl.
CPC ............ *A61K 8/9789* (2017.08); *A61K 31/05* (2013.01); *A61K 31/085* (2013.01); *A61K 31/19* (2013.01); *A61K 31/20* (2013.01); *A61K 31/201* (2013.01); *A61K 31/202* (2013.01); *A61K 31/23* (2013.01); *A61K 31/231* (2013.01); *A61K 31/232* (2013.01); *A61K 31/357* (2013.01); *A61K 36/738* (2013.01); *A61Q 17/005* (2013.01); *A61K 2236/39* (2013.01)

(56) References Cited

OTHER PUBLICATIONS

Illés, et al., Extraction of hiprose fruit by supercritical CO2 and propane, J. Supercrit. Fluids., 10 (1997) pp. 209-218. (Year: 1997).*
Amalia Di Petrillo, et al., Broad-range potential of Asphodelus microcarpus leaves extract for drug development, BMC Microbiology, 2017, pp. 1-9, vol. 17 No. 159.
Emily M. Eichenberger, et al., Epidemiology and Mechanisms of Resistance of Extensively Drug Resistant Gram-Negative Bacteria, Antibiotics, 2019, pp. 1-21, vol. 8 No. 37.
Kevin L. Schwartz, et al., Travel and the Spread of Drug-Resistant Bacteria, Current Infectious Disease Reports, 2018, pp. 1-10, vol. 20 No. 29.
Nadim G. El Chakhtoura, et al., Therapies for multidrug resistant and extensively drug-resistant non-fermenting gram-negative bacteria causing nosocomial infections: a perilous journey toward "molecularly targeted" therapy, Expert Rev Anti Infect Ther., 2018, pp. 1-41, vol. 16 No. 2.
Eirini Christaki, et al., Antimicrobial Resistance in Bacteria: Mechanisms, Evolution, and Persistence, Journal of Molecular Evolution, 2020, pp. 26-40, vol. 88.
Christina E. Maddox, et al., Antibacterial Activity of Phenolic Compounds Against the Phytopathogen Xylella fastidiosa, Curr Microbiol, 2010, pp. 53-58, vol. 60.
Elli A. Wright, et al., Divergence of a strain of Pseudomonas aeruginosa during an outbreak of ovine mastitis, Veterinary Microbiology, 2015, pp. 105-113, vol. 175.
Bahman Khameneh, et al., Review on plant antimicrobials: A mechanistic viewpoint, Antimicrobial Resistance and Infection Control, 2019, pp. 1-28, vol. 8, 118.
Preet Amol Singh, et al., A Review on Plant Antimicrobials of Past Decade, Current Topics in Medicinal Chemistry, 2018, pp. 1-22, vol. 18. No. 00.
Agnieszka Arceusz, et al., Methods for Extraction and Determination of Phenolic Acids in Medicinal Plants: A Review, Natural Product Communications, 2013, pp. 1821-1829, vol. 8 No. 12.
Hua-Bin Li, et al., Evaluation of two methods tor the extraction of antioxidants from medicinal plants, Anal Bioanal Chem, 2007, pp. 483-488, vol. 388.
Bruno Marongiu, et al., 2012, Chapter 2: Traditional and modern methods for the preparation of essential oils, In: Essential Oils as Natural Food Additives, 2012, pp. 1-21.
Michele M. Schantz, et al., Comparison of supercritical fluid extraction and Soxhlet extraction for the determination of polychlorinated biphenyls in environmental matrix standard reference materials, Journal of Chromatography A, 1998, pp. 213-220, vol. 816.
Boryana Trusheva, et al., Different extraction methods of biologically active components from propolis: a preliminary study, Chemistry Central Journal, 2007, pp. 1-4, vol. 1 No. 13.
Beatrica Kaufmann, et al., Recent Extraction Techniques for Natural Products: Microwave-assisted Extraction and Pressurised Solvent Extraction, Phytochemical Analysis, 2002, pp. 105-113, vol. 13.
Klara Szentmihalyi, et al., Rose hip (*Rosa canina* L.) oil obtained from waste hip seeds by different extraction methods, Bioresource Technology, 2002, pp. 195-201, vol. 82.
S. Taneva, et al., Super-critical carbon dioxide extraction as an effective green technology for production of high quality rose hip oil, Bulgarian Chemical Communications, 2017, pp. 126-131, vol. 49.
Sara Rebolleda, et al., Supercritical fluid extraction of corn germ oil: Study of the influence of process parameters on the extraction yield and oil quality, The Journal of Supercritical Fluids, 2012, pp. 270-277, vol. 72.
Ying Tong Soo, et al., Evaluation of EUCAST rapid antimicrobial susceptibility testing (RAST) directly from blood culture bottles, European Journal of Clinical Microbiology & Infectious Diseases, 2020, pp. 993-998, vol. 39.
EUCAST Definitive Document E.Def 3.1, Determination of minimum inhibitory concentrations (MICs) of antibacterial agents by agar dilution, European Committee tor Antimicrobial Susceptibility Testing (EUCAST) of the European Society of Clinical Microbiology and Infectious Diseases (ESCMID), Clinical microbiology and infection, 2000, pp. 509-515, vol. 6 No. 9.
Undurti N. Das, Can Bioactive Lipids Inactivate Coronavirus (COVID-19)?, Archives of Medical Research, 2020, pp. 282-286, vol. 51.
Halldor Thormar, et al., Inactivation of Enveloped Viruses and Killing of Cells by Fatty Acids and Monoglycerides, Antimicrobial Agents and Chemotherapy, 1987, pp. 27-31, vol. 31 No. 1.
Hitesh K. Agarwal, et al., Synthesis and Biological Evaluation of Fatty Acyl Ester Derivatives of (−)-2',3'-Dideoxy-3'-thiacytidine, Journal of Medicinal Chemistry, 2012, pp. 4861-4871, vol. 55.
P. Garcia-Oliveira, et al., Scientific basis for the industrialization of traditionally used plants of the Rosaceae family, Food Chemistry, 2020, pp. 1-16, vol. 330, 127197.
Antonio Barberis, et al., Antioxidant, Antimicrobial, and Other Biological Properties of Pompia Juice, Molecules, 2020, pp. 1-18, vol. 25, 3186.
Anna Pintus, et al., [Au(pyb-H)(mnt)]: A novel gold(III) 1,2-dithiolene cyclometalated complex with antimicrobial activity (pyb-H = C-deprotonated 2-benzylpyridine; mnt = 1,2-dicyanoethene-1,2-dithiolate), Journal of Inorganic Biochemistry, 2017, pp. 188-194, vol. 170.
Pseudomonas aeruginosa (Schroeter) Migula, Retrieved From: https://www.lgcstandards-atcc.org/products/all/15442.aspx?geo_country=it.
Center for Biofilm Engineering, Retrieved From: http://www.biofilm.montana.edu/.

(56) References Cited

OTHER PUBLICATIONS

Maria Letizia Manca, et al., Optimization of Innovative Three-Dimensionally-Structured Hybrid Vesicles to Improve the Cutaneous Delivery of Clotrimazole for the Treatment of Topical Candidiasis, Pharmaceutics, 2019, pp. 1-18, vol. 11, 263.
Enrico Podda, et al., Antibacterial Activity of Amidodithiophosphonato Nickel (II) Complexes: An Experimental and Theoretical Approach, Molecules, 2020, pp. 1-18, vol. 25, 2052.
Klara Szentmihalyi, et al., Rose hip (*Rosa canina* L.) oil obtained from waste hip seeds by different extraction methods, Bioresource Technology, 2002, pp. 195-201, vol. 82, XP-002708687 .
Siti Machmudah, et al., Process optimization and extraction rate analysis of carotenoids extraction from rosehip fruit using supercritical $CO_2$, J. of Supercritical Fluids, 2008, pp. 308-314, vol. 44.
Eduardo A. Richter, et al., Thermodynamic properties of $CO_2$ during controlled decompression of supercritical extraction vessels, The Journal of Supercritical Fluids, 2015, pp. 102-110, vol. 98.
Jolanta Pulit, et al., Preparation of Nanosilver and Nanogold Based on Dog Rose Aqueous Extract, Bioinorganic Chemistry and Applications, 2014, pp. 1-14, vol. 2014, 658935.
Global Laboratory Standards for a Healthier World, Retrieved from: https://clsi.org/.

\* cited by examiner

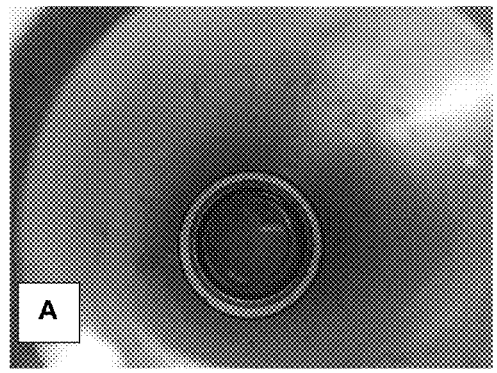 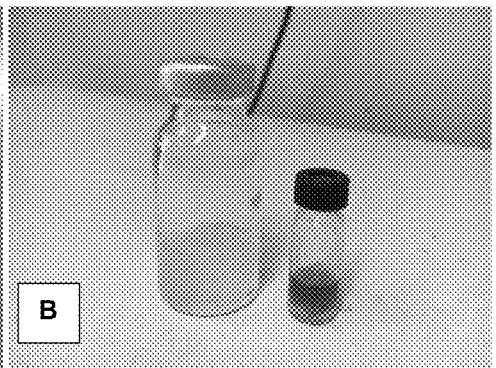
FIG. 3A  FIG. 3B
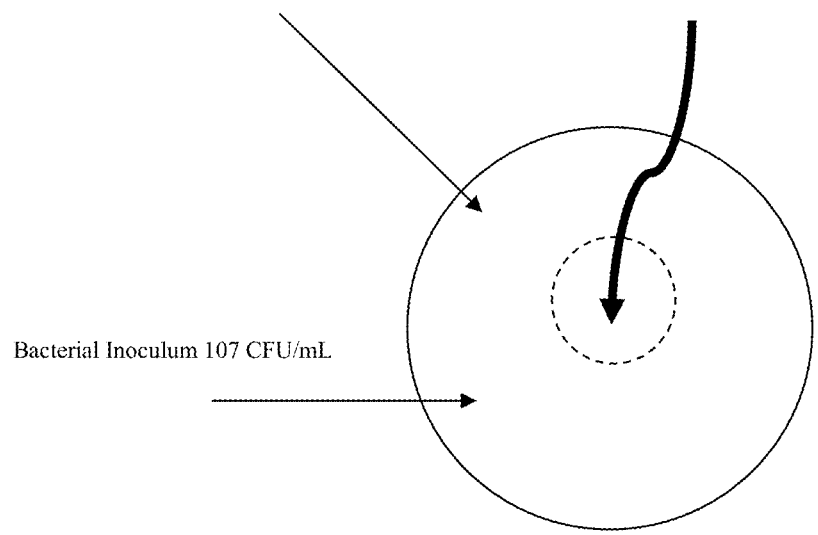
FIG. 4

ROSA CANINA ROSEHIP

CROSS REFERENCE TO THE RELATED APPLICATIONS

This application is the national phase entry of International Application No. PCT/IB2020/062317, filed on Dec. 22, 2020, the entire contents of which are incorporated herein by reference.

TECHNICAL FIELD

The present invention relates to the realization of a natural extract with high antimicrobial activity. This extract, which can be diluted in water at different concentrations, constitutes an antimicrobial solution that can be used in various fields: in environmental disinfection, both in humans and animals, as a base for antibacterial/antifungal preparations for topical, cutaneous or mucosal use.

The extract, object of the present invention can be used in the preparation of disinfectant solutions that can be used for: handpieces and surfaces in the outpatient-hospital and domestic field, air conditioner filters, environments used for preparing food, as an ingredient in mouthwashes, toothpastes and skin creams. In general in all those areas where it is necessary to adopt antimicrobial prophylaxis.

BACKGROUND

Antibiotic resistance is currently a global problem involving virtually the entire world population. In addition to the causes related to abuse and incorrect methods of intake/administration and the appearance of multi-resistant microbial strains (Multidrug Resistant MDR strains), there is also the lower investment by the pharmaceutical industries in the study of new active molecules [1-4]. In this regard, the World Health Organization (WHO) published in 2017 an alarm on the presence, in the health sector, of super-bacteria now refractory to current treatments, among them high priority, some nosocomial pathogens are mentioned, among which: *Pseudomonas aeruginosa* and several species belonging to the Enterobacteriaceae family. There is therefore a need for the development of new antimicrobials [5].

A similar problem is detected in the use of disinfectants in which the use of synthetic substances, often highly toxic, also raises the problem of environmental contamination.

The alarm on antimicrobial controls involves, in parallel, apparently different but cohesive fields in the same problem; we think, for example, of the veterinary sector as well as the agricultural sector where some newly acquired bacterial infections are bringing entire production chains to their knees, such as the spread of *Xylella fastidiosa* [6] in the olive growing sector or infections in sheep due to mastitis from *P. aeruginosa* [7].

There are estimated to be 250,000 to 500,000 plant species on Earth. A relatively small percentage, between (1 and 10%) of these, are used as food by humans and/or other animal species. It is possible that this percentage will increase further due to increased use for their medicinal properties.

Although natural remedies for microbes and infections have been in use for thousands of years, the use of plant extracts, in whole or in parts of them, has never involved the development of antimicrobials. The reasons are different and often depend on the difficulty of using a single species, on the variability of the extract and consequently on the biological activity of the vegetable preparation obtained from it and-an important aspect-the processing system used to obtain the formulation [8].

Currently, plant extracts of very different origins are used both for the phylogenetic belonging of the plant and for the different type of plant organs subjected to extraction eg. leaves, fruits, seeds etc. In recent years, however, the use and research of drugs derived from plants has been progressively increasing; in particular to obtain derivatives that could be used against infectious diseases. Currently (25-30)% of pharmaceutical products in use derive from plants, but few have entered the market against infections, as disinfectants or as drugs for human use, despite the fact that plants are rich in a great variety of secondary metabolites (substances belonging to the classes of tannins, terpenoids, alkaloids and flavonoids, which show in vitro discrete antimicrobial properties) [9].

Various techniques are used to extract active compounds, starting from the plant product, which play a critical role in determining the results of biological assays. In fact, the literature reports a vast range of different technologies in terms of extract composition, yield, environmental impact, costs, feasibility of scale up to the development of an industrial process [10, 11].

The main extraction methods known to date can be listed as follows: hydrodistillation, steam distillation, maceration, infusion, percolation, decoction, extraction with organic solvents, microwave assisted extraction (MAE), accelerated extraction with solvents (Accelerated solvent extraction, ASE), ultrasound-assisted extraction (UAE), extraction using supercritical fluids (Supercritical Fluid Extraction, SFE) [12].

Shortcomings of the State of the Art

In general, the shortcomings in the isolation of antimicrobial biocompounds from plant matrices can be highlighted in the pre-extraction, extraction and post-extraction (analytical) phases as follows:

a) Pre-extraction deficiencies: they concern the difficulty of finding standardized starting matrices. The type and characteristics of the plant material used depend on multiple geographical and climatic factors, the harvesting period, the cultivation techniques as well as the methods of harvesting, drying, storage, handling and transport that can cause unwanted alterations.

b) Shortcomings in the extraction procedure: a first problem is represented by the management and disposal of organic waste, consisting of exhausted biomasses generated by the extraction process; especially if you use maceration or extraction techniques that require large quantities of solvent. Organic solvents and flammable liquids with a high vapor pressure are often used, which are likely to generate significant toxic emissions during extraction. The solvents used in the separation system must also be of high purity, an aspect that could lead to an additional operating cost, which cannot be managed commercially [13]. The choice of the type and duration of the extraction is sometimes crucial for the stability of the final products; for example with MAE, high damage has been detected in bio-compounds such as tannins and anthocyanins when additional irradiation cycles are applied. Similarly, the use of ultrasound frequencies higher than 20 kHz could degrade bio-compounds due to the increased probability of producing free radicals [15].

c) Post-extractive (analytical): they primarily concern the analysis approach of biological activity; the planning of the procedure for the assays on the antibacterial activity must be adapted to the chemical-physical characteristics of the extract such as water solubility and density.

The technical problem posed by the known art is the shortage of antibiotics effective against microorganisms that have developed antibiotic-resistance, in particular with regard to bacterial and fungal strains resistant and multi-resistant (MDR) to different antibiotics/antifungals/disinfectants, such as for example: *S. aureus* methicillin-resistant, *P. aeruginosa* ATCC 15442, *Klebsiella pneumoniae*, fungal strains of *Candida* ssp multidrug-resistant.

With reference to *Rosa canina*, extraction and analytical methods are known as follows.

In Szentmihályi K. et al. 2002 [16]-work whose purpose was to obtain the isolation of the oily fraction by means of different extraction techniques-the results relating to the analysis of the fatty acids and dyes contained in the oil obtained by $CO_2$-SFE at 250 bar, 35° C. for the duration of 80 minare reported. The authors do not specify whether the desired oily extract was obtained together with an aqueous solution. The obtained extracts have not been tested as antimicrobials, nor are any uses of extracts as antimicrobials indicated.

In the work of Taneva S. et al. 2017 [17]-which set out to ascertain the optimal conditions for extracting seed oil *R. Canina*-the quantities of tocopherol and carotenoids and the percentages of fatty acids determined on extracts obtained by extraction with hexane or with $CO_2$ Supercriticalat (350 and 450) bar. By means of $CO_2$-SFE the authors obtain an oily fraction and an aqueous fraction which, however, they choose to throw away without subjecting it to chemical and biological investigation. Also in this case, no uses of the extracts obtained are indicated, nor are uses of extracts as antimicrobials indicated.

The choice not to consider the aqueous fraction is well explained in a paper by Rebolleda et al. [18] where its removal is recommended and its use is not recommended as the presence of water in a lipid extract favors the rancidity process and the oxidation of fatty acids. It follows that whenever extraction with $CO_2$ in the supercritical phase is used to obtain a lipid fraction from oil seeds, the authors focus on optimizing the operating parameters in order to maximize yields and quality of the recovered oils.

These considerations discouraged the use of aqueous phases deriving from supercritical extractions with $CO_2$.

The technical problem posed by the known art therefore remained unsolved, i.e. the shortage of antibiotics effective against microorganisms that have developed antibiotic-resistance, in particular with regard to bacterial and fungal strains resistant and multi-resistant (MDR) to different antibiotics/antifungals/disinfectants, such as: *S. aureus* methicillin-resistant, *P. aeruginosa* ATCC 15442 used as a standard of resistance to disinfectants, a nosocomial isolate of *Klebsiella pneumoniae*, a clinical isolate of *Candida albicans* multidrug-resi stantto azoles.

The inventors, investigating the aqueous fractions, have now unexpectedly and experimentally found a marked antimicrobial activity of the aqueous phase of the extracts from supercritical fluids which has led them to enhance a by-product of the extract that was considered undesirable by the scientific community, for which they were chosen. operating conditions such as to minimize its production and which in any case was discarded as unwanted.

In the works of Szentmihályi K. et al. 2002 and Taneva S. et al. 2017 [17], previously cited, the same technique used by the inventors on the same type of matrix (seeds *Rosa canina*) is used, but adopting in the extraction and separation section of the plant operating conditions different from those of the present invention.

The inventors have now unexpectedly and experimentally found that, by suitably modulating the temperature but above all the pressure-which has a much wider range of variability-it is possible to regulate the solvent power of the extracting fluid, both in the extraction section and in the release section of the extracts, allowing to obtain an aqueous extract particularly active for antimicrobial activity and thus solving the problems of the known art.

SUMMARY

The aim of the present invention is therefore to develop a *R. Canina* seed extract obtained by extraction with $CO_2$ in the supercritical state.

The basic stages of the extraction, performed on a starting plant matrix consisting of seeds of *Rosa canina*, are the following:

The seeds, dried and ground, are subjected to extraction with $CO_2$ in the supercritical phase under the following operating conditions: pressure between 80 and 100 bar, temperature between 40 and 60° C.; extraction time between 2 and 8 h; $CO_2$ flow rate between 0.8 and 1.5 kg $h^{-1}$; mass of the matrix, $m_0$, between 200 and 350 g; relative quantity of solvent (total mass of solvent/matrix mass subjected to extraction) $m_s/m_0$ between 5 and 40.

Always inside the equipment in the separation section, conducted at a pressure between 5 and 20 bar and a temperature between 5 and 40° C.; separation of the extract from the solvent is carried out, which is removed as a gas.

The recovery of the total extract from the separator is achieved by opening the valve located on the bottom of the separator; in conditions of ambient temperature and pressure, the extract spontaneously separates into two liquid phases, one oily and one aqueous.

The two phases are separated, for example by suction and placed in separate containers.

Then store in the refrigerator (typically at +4° C.) waiting to be analyzed. At an industrial level, on a pilot scale and in artisanal production, separation can be achieved by decantation associated with cooling or, more efficiently and quickly, by centrifugation.

The final extract of interest, consisting only of the aqueous fraction, as it is or diluted in water or hydroalcoholic solvents, can be used directly for the preparation of the various formulations. The oily phase is not discarded as the oil can be used in the cosmetic industry by virtue of its content in fatty acids, carotenoids and vitamins such as tocopherol.

The extract consists of an aqueous solution. The water content, determined by TGA and gravimetric analysis, is between 90% and 99.9%. The dry fraction, which is in complement to 100, comprises organic compounds. The main organic components of the extract, based on GC-MS analysis with HP5-MS apolar column, are the following: methyl linoleate (31.4%), methyl oleate (25.1%), methyl palmitate (7.5%), ethyl linoleate (4.7%) and ethyl linolenate (3.3%) (Table 1). The content of these compounds is therefore: methyl linoleate: 0.031-3.1%, methyl oleate: 0.025-2.5%, methyl palmitate: 0.0075-0.75%, ethyl linoleate: 0.0033-0.33%.

Other compounds, identified by ESI-MS analysis, are:
palmitic acid, linolenic acid, linoleic acid, oleic acid, stearic acid, benzoic acid, methoxybenzoic acid, 1-hydroxy-i acid, j-dimethyl-cyclohexanecarboxylic acid, 3,4-dimethoxy-cyclohexanecarboxylic; trihydroxybenzene; methoxyhydroxybenzene de ethoxy-phenyl-3-propanol (Tables 2 and 3).

The extract and the process are identified in the attached claims and their use is in both the cosmetic and pharmaceutical fields.

Another object of the invention are the compositions comprising effective quantities of the R. Canina extract as a cosmetic and pharmaceutical active ingredient.

Further objects will become apparent from the detailed description of the invention.

BRIEF DESCRIPTION OF THE DRAWINGS

FIG. 1A) whole fruit; FIG. 1B) sectioned fruits; FIG. 1C) seeds; FIG. 1D) ground seeds.

FIGS. 3A-3B. FIG. 3A) Extracts of seeds of Rosa canina, obtained by SFE, collected inside the separator before recovery. FIG. 3B) The two types of recovered extracts, intended for biological tests and chemical analyzes.

FIG. 4. Structure of the Kirby-Bauer system (for bacteria and fungi).

DETAILED DESCRIPTION OF THE EMBODIMENTS

Figures 1A, 1B:
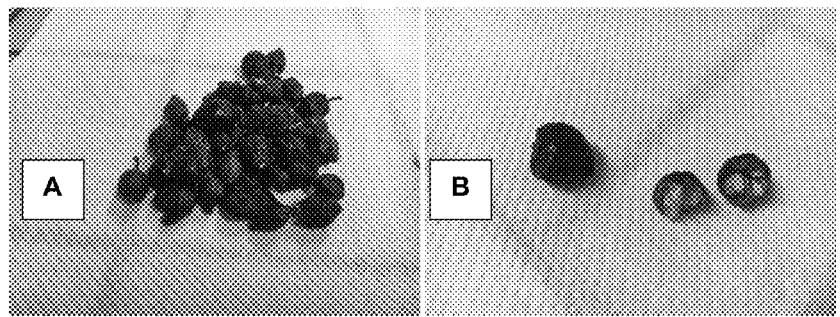
FIGS. 1A-1D. Vegetable matrix (species Rosa canina) in the various pre-treatment stages.
Figures 1C, 1D:
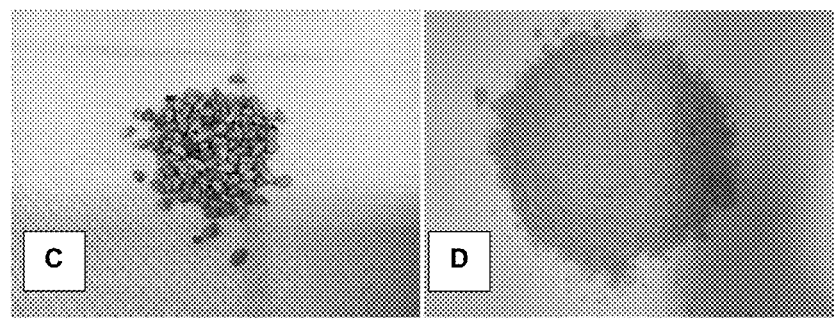

The present invention relates to obtaining an extract from seeds of Rosa canina means of carbon dioxide in the supercritical state and its use as an antimicrobial.

An antimicrobial is a natural or synthetic substance that can kill or inhibit the growth of bacteria, fungi, viruses and parasites. Therefore, the extract according to the present invention can be defined as antibacterial, antifungal, antiviral and disinfectant. The latter terms mean, respectively: natural or synthetic substance having the ability to kill bacteria or to inhibit their growth; natural or synthetic substance capable of killing fungi or capable of inhibiting their growth; natural or synthetic substance having the ability to kill viruses or inhibit their growth; natural or synthetic substance capable of drastically reducing the presence of bacteria, fungi, viruses and protozoa from surfaces and environments.

More specifically, the invention relates to the use of the extract from seeds of Rosa canina for antibacterial/antifungal preparations as defined above for cutaneous or mucosal use eg. in the preparation of creams or mouthwashes, as well as environmental disinfectant, both in the human, animal and vegetable fields.

In the experimental works reported below, standardized international methodologies were used as basic analytical methods for the assay of antibiotics, such as the EUCAST protocols (The European Committee on Antimicrobial Susceptibility Testing-EUCAST) [19, 20].

The results of the in vitro experimentation showed a remarkable antimicrobial activity of the extract against Gram positive bacteria (Staphylococcus aureus MRSA), pathogenic streptococci and Gram negative bacteria (Escherichia coli), as well as some clinical isolates of nosocomial origin such as Pseudomonas aeruginosa and Klebsiella pneumoniae. A high antifungal activity against Candida albicans azole-resistant was also observed. The preparation was found to be bactericidal and antibiofilm (antimicrobial or antimicrobial substance capable of inhibiting biofilm structuring) at low concentrations, in the order of µg/mL, towards all tested strains.

The invention consists in obtaining an extract from seeds of rosehip by means of carbon dioxide in the supercritical state, and in the subsequent use as an antimicrobial. In fact, the preparation obtained has a very high microbicidal activity, using the standard method of the European committee for antimicrobial susceptibility tests (EUCAST-ISO 20776-2) [19-20], against the following multi-resistant pathogens to antibiotics (MDR): Staphylococcus aureus Methicillin-resistant(MSRA); Streptococcus pyogenes; Streptococcus mutans, Escherichia coli; Pseudomonas aeruginosa (mucoid strain, nosocomial clinical isolate); Klebsiella pneumonia (nosocomial isolate); Candida albicans, Candida krusei and Candida glabrata (azole-resistant clinical isolates). Furthermore, considering the presence of bioactive lipids in the extract, in particular the esters of saturated or polyunsaturated fatty acids, an antiviral activity of the preparation against various viruses, including Sars-CoV-2 is desirable [21-23].

Description, Characteristics and Peculiarities of the Extraction Technique

The extraction technique that uses high pressure carbon dioxide (SFE) is still little used in industrial applications due to the greater complexity of the instrumentation and greater difficulty of management than the existing one, despite it offers numerous advantages, such as better product quality (free of contaminating solvent residues, thermal degradation products and compounds that are generated as a result of the chemical-physical treatment, called artifacts) and guarantees a high degree of eco-sustainability. Carbon dioxide is an easily available, low-cost, non-toxic substance that spontaneously separates-moving away in the form of gas-from the extract and exhausted matrix in the final phase of the extraction process. Although considered one of the responsible for the greenhouse effect, in the extraction processes it is not produced but that coming from natural reserves or recovered as a by-product of other production cycles is used; in industrial plants, moreover, it is usually recycled.

Other extraction techniques, tested by us on the same matrix, have provided formulations having antiproliferative activity far lower than those of the extract in question.

Obtaining the Extract

The starting plant matrix consists of seeds of *Rosa canina*, a plant of the Rosaceae family that is easily available and cultivable in the case of massive productions. The seeds are present in the rose hips of the plant and undergo the extraction procedure which includes the following basic stages:

- The seeds, dried and ground, are subjected to extraction with $CO_2$ in the supercritical phase under the following operating conditions: pressure ≤100 bar, preferably between 80 and 100 bar, temperature ≤60° C., preferably between 40 and 60° C.; extraction time ≤8 h, preferably between 2 and 8 h; relative quantity of solvent (total mass of solvent/matrix mass subjected to extraction) $m_s/m_0$ between 5 and 40.
- Separation conducted at pressure ≤20 bar, preferably between 5 and 20 bar and temperature ≤40° C., preferably between 5 and 40° C.; separation of the extract from the solvent is carried out, which is removed as a gas.
- Recovery of the total extract; under conditions of ambient temperature and pressure the extract spontaneously separates into two liquid phases-one oily and one aqueous.
- The two phases are separated, for example by suction and placed in separate containers. Then store in the refrigerator (typically at +4° C.) waiting to be analyzed. At an industrial level, on a pilot scale and in artisanal production, separation can be achieved by decantation associated with cooling or, more efficiently and quickly, by centrifugation.
- The final extract of interest, consisting only of the aqueous fraction, can be used as it is or diluted in water or hydroalcoholic solvents, and can be used directly for the preparation of the various formulations. The oily phase is not discarded as the oil can be used in the cosmetic industry by virtue of its content in fatty acids, carotenoids and vitamins such as tocopherol.
- The composition of the extract, based on the analyzes carried out, is found to be:
  - Among the components identified by GC-MS there is the presence of apiol and methyl or ethyl esters of palmitic, oleic, stearic and linoleic fatty acids (Table 1). The values shown in the table correspond to the percentage composition by mass of the organic fraction of the aqueous extract.
  - By means of the ESI-MS and OrbitrapElite techniques it was possible to identify palmitic acid, linolenic acid, linoleic acid, oleic acid and stearic acid; and some derivatives of tannins, such as: trihydroxybenzene, methoxidihydroxybenzene, ethoxy phenyl-3-propanol, benzoic acid, methoxybenzoic acid, 1-hydroxy-i acid, j-dimethylcyclohexanecarboxylic acid and 3,4-dimethoxy-cyclohexanecarboxylic acid (Table 2 and 3).

The extract according to the invention consists only of the aqueous fraction, obtained together with the oily fraction from the seeds of the rose hips of the specie *Rosa canina*. The extraction is carried out using pure $CO_2$, without the use of organic solvents acting as co-solvents or entrainer.

To the best of the inventors' knowledge, no information is reported in the literature regarding the composition and antimicrobial activity of similar aqueous extracts obtained from the seeds of *Rosa canina*.

The efficacy of the extract has been tested against bacterial and fungal strains resistant and multidrug-resistant (MDR) to different antibiotics/antifungals/disinfectants, such as: *S. aureus* ATCC BAA-811 methicillin-resistant, *P. aeruginosa* ATCC 15442 used as disinfectant resistance standard, a nosocomial isolate of *Klebsiella pneumoniae* NC5, a clinical isolate of *Candida albicans* BF1 multidrug-resistant to azoles.

In fact, it should be noted that the extract showed a relevant antimicrobial activity, according to the EUCAST methods and with respect to different pathogenic microorganisms, including some prone to develop antibiotic resistance: *Pseudomonas aeruginosa*, *Klebsiella pneumoniae*, *Streptococcus mutans*, *Staphylococcus aureus* and *Candida albicans*.

The resistance profiles of the microbial strains mentioned above, evaluated by the inventors and available in the literature, are reported in Tables 4 and 5 [24-26].

The extract according to the invention can be formulated in liquid form, as a cream or lotion or as a gel or spray for topical applications on animals and humans, including children and the elderly, as well as on vegetables. Topical applications include applications on the skin and mucous membranes. The carriers can be all those used in the pharmaceutical and cosmetic fields. The application can also be done on plants with the carriers typically used for applications on plants. The extract can also be formulated in liquid, semi-liquid or gel form to be applied on the surfaces to be treated. The application can also be a spray. The extract can also be formulated in semi-liquid, creamy, semi-solid or solid formulations such as creams, suspensions, milks or soaps.

Adjuvants and carriers are cosmetically and pharmaceutically acceptable, as well as adjuvants and carriers used in the phytopharmaceutical field. The carriers include single and multi-lamellar liposomes.

The use of the SFE technique-a technique considered green-for the extraction of seeds of rosehip allows the obtaining of bioactive preparations free from contaminants.

The extract thus obtained can be used as a functional antimicrobial base in preparations for human, animal and vegetable use, as indicated below:
- Creams for skin use, also carried with liposomes.
- Antibacterial gels or solutions for oral dental use in the treatment of peri-implantitis and periodontitis (also carried with liposomes).
- Functional base for mouthwashes and toothpastes.
- Antifungal creams or gels for topical use.
- The extract can also be used as an antimicrobial functional base in disinfection:
- In household hygiene products as a natural disinfectant.
- In skin disinfectants, soaps etc. ex. in pre-operative disinfection.
- In hospital wards, against the transmission of nosocomial cross-infections.
- Disinfectants or community hygiene products eg hotels, airports, schools.
- In private medical practices (eg dental offices).
- In the disinfection of surgical instruments.
- As a line disinfectant for fluids eg. water in dental units or air in ventilation/conditioning systems.
- In environmental disinfection systems using automatic devices, eg. nebulizers.

The extract can be used as a functional antimicrobial base in the veterinary field, in gelled and liquid preparations (to be used as such or nebulized) for:

Skin disinfection in farmed or companion animals.
Treatment of cutaneous mycosis.
Treatment of eradication of pathogenic bacteria.
Disinfection of milking systems.

The extract can be used as a functional antimicrobial base in the agricultural field:

For the treatment of diseases of plants in culture or in ornamental plants.
In the disinfection of environments or equipment used in the packaging industry of both fresh and preserved food products.

The following examples are provided for the sole purpose of illustrating the invention and are not to be considered in any way limitative of its scope.

Materials

The whole and dried fruits—named rose hips of *Rosa canina* L., belonging to the Rosaceae family, were purchased by the Minardi company (Bagnacavallo-RA-Italy) Lot N°MP0480, from Albania, collected from the wild in 2018.

From receipt, the matrix was stored in a cool and dry place at a temperature not exceeding 25° C.

To prepare the feed to be extracted (FIGS. 1A-1D) the fruits were cut in two and the seeds (achenes) separated from the pulp. The seeds were cleaned from the surface hair present by sieving and then ground and reduced to powder.

The carbon dioxide (purity, v/v>99.7%) in 30 kg cylinders equipped with a dip tube, was supplied by Air Liquide-Italy.

Extraction Plant

Figure 2:
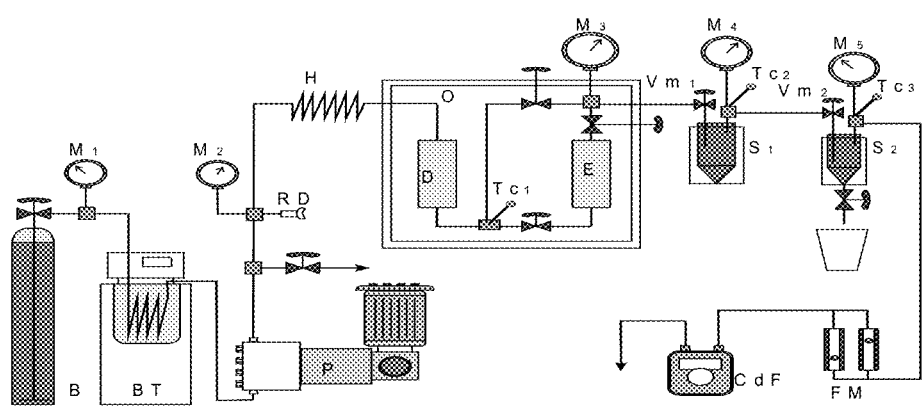
FIG. 2. Scheme of the laboratory extraction system with supercritical fluids: B $CO_2$ cylinder with dip tube; M1-M5 pressure gauges; BT cryo-thermostat; H pre-heater; P pump for liquids; RD burst disc; D, lung; Tc1-Tc3 thermocouples; And extractor; Vm1, Vm2 micrometric valves; S1, S2 separators; FM flow meter; CdF flow meter.

The extracts object of this patent proposal were obtained using a Supercritical Phase Extraction laboratory, SFE, using carbon dioxide, $CO_2$, as a solvent. The scheme is shown in FIG. 2. The non-commercial equipment-maximum operating pressure of 350 bar-was designed by our research group and made materially, on commission, by a mechanical processing company. It is equipped with an extractor with a capacity of 0.32 $dm^3$ and two separators in series, with a volume of 0.32 and 0.25 $dm^3$ respectively. The second separator is equipped, on the bottom, with a micrometric valve which allows-also thanks to the existing pressure head, at any time of the extraction-the tapping of the liquid extracts that accumulate during the experiment. The $CO_2$ is circulated in the system through the use of a high pressure liquid pump (LEWA EL 1) while the fine pressure regulation, in the main sections of the system, is carried out with micrometric and regulation valves-of type pressure regulator and back pressure of TESCOM (not shown in FIG. 2).The measurement of the pressures is carried out by means of manometers, while the temperatures are measured by $\frac{1}{8}$" Fe/Const thermocouples. The instantaneous $CO_2$ flow rate is measured by a calibrated rotameter placed downstream of the plant, while the total quantity is evaluated by means of an ELSTER HANDEL counter.

Obtaining the Extract by Means of SFE

The extract in question was obtained, starting only from seeds of rosehip finely ground, using the plant just described with the single separator setup. The operating conditions are indicated below: pressure 90 bar and temperature 40° C., in the extraction section; 20 bar and 40° C. in the separation section; extraction time 4 h; $CO_2$, flow rate 1.2 kg $h^{-1}$. At 90 bar and 40° C. the $CO_2$ has a high density and solvent power while at 20 bar and 40° C. the $CO_2$ returns to the state of sub-critical gas, loses its solubilizing power and releases the extract to the inside the separator. By opening the lower valve of the separator it is possible to collect the final extract from which the gaseous $CO_2$ at ambient pressure and temperature moves away spontaneously. In each of the tests carried out, an average of 300 g of matrix was loaded into the extractor.

Three repeated extractions were performed, using the same matrix lot, in order to verify the reproducibility of the obtained results.

The extract obtained consisted of two clearly distinguishable phases (FIGS. 3A-3B); an aqueous phase, clear with a milky appearance (called S2 in the tables showing the biological activities) and an oily phase of green-orange color. They were separated by aspirating them with two different pipettes; the samples were then transferred into two bottles and stored in the refrigerator at +4° C.

Characterization of the Extract

The aqueous extracts thus obtained from the seeds of *R. canina* were subjected to instrumental investigation in order to determine their chemical composition.

Thermo Gravimetric Analysis, TGA

From the analysis of the traces that make up the thermograms, it was possible to obtain the fraction, by mass, of dry matter present in the aqueous extracts between (0.1 and 10)% (w/w).

Gas Chromatographic Analysis Coupled to Mass Spectrometry, GC-MS

At the operating conditions adopted, chromatograms were obtained which show sufficiently resolved peaks.

The chromatographic data allows to calculate the percentage composition of each organic component of the sample under study. They are reported in Table 1 as a function of retention time, $t_r$, and retention indices defined in accordance with Kovats, IK.

Among the components identified by GC-MS there is the presence of apiol and methyl or ethyl esters of palmitic, oleic, stearic and linoleic fatty acids, having 16, or 18 carbon atoms and none, one or two unsaturations. The peaks of the esters appear in the chromatogram at $t_r$ between (40 and 50) min and at $I_{K{teo}}$ between 1900 and 2200. At higher $t_r$ and $I_K$ some long-chain hydrocarbon compounds saturated or containing an unsaturation have been identified, typical constituents of plant cuticular waxes.

Ionization Mass Spectrometry for Electro Vaporization (Electron Spray Ionization Mass Spectrometry), ESI-MS, and High Resolution Mass Spectrometry, HRMS In negative ionization mode, performed in ESI-MS it was possible to observe in the mass spectrum of the mixture, peaks with an m/z ratio 255, 277, 279, 281 and 283 corresponding respectively to palmitic acid, linolenic acid, acid linoleic, oleic acid and stearic acid also identified with the exact mass determined using an OrbitrapElite high resolution mass spectrometer (Table 2).

Again with reference to the spectra performed in negative ionization mode, the peaks showing an m/z ratio of 121, 151, 171 and 187 are respectively attributable to the following compounds, typical degradation products of tannins: benzoic acid, methoxybenzoic acid, acid 1-hydroxy-i, j-dimethylcyclohexanecarboxylic acid and 3,4-dimethoxycyclohexanecarboxylic acid. The identification was confirmed by the exact mass measurements obtained by OrbitrapElite (Table 3)

The most abundant peaks detected with positive ionization show an m/z ratio of 127 attributable to a trihydroxybenzene while the peaks with an m/z ratio 141 and 163 correspond to a methoxyhydroxybenzene and the peaks with an m/z ratio 181 and 203 are attributable to an ethoxy phenyl-3-propanol all derived from tannins and identified by the exact mass provided by the OrbitrapElite.

NMR Nuclear Magnetic Resonance Spectrometry

The $^1$H spectra of the samples are consistent, confirming the good reproducibility of the extraction technique adopted. The spectra appear quite complex; numerous signals can be identified in the aliphatic zone between (1 and 3) ppm, signals attributable to aromatic groups, between (7 and 8) ppm; typical signals of aldehyde groups, between (9 and 10) ppm. The characteristic signals of esters, between (4 and 5) ppm, are masked by the large water peak at 4.7 ppm.

These indications confirm the identifications obtained through the previously mentioned techniques. In fact, apiol (a phenylpropanoid) and most of the tannin derivatives contain an aromatic ring; while the alkyl groups constitute the skeleton of acids and esters; as well as the substituents of some aromatic compounds.

The extract consists of an aqueous solution. The water content, determined by TGA and gravimetric analysis, is between 90% and 99.9% mass/mass. The main organic components of the extract, based on GC-MS analysis with HP5-MS apolar column (5% phenyl-95% methylpolysiloxane), are the following: methyl linoleate (31.4%), methyl oleate (25.1%), methyl palmitate (7.5%), ethyl linoleate (4.7%) and ethyl linolenate (3.3%) with respect to the dry fraction of the extract, between 0.1% and 10% (mass/mass) (Table 1).

Other compounds, identified by ESI-MS analysis, are: palmitic, linolenic, linoleic, oleic, stearic, benzoic, methoxybenzoic, 1-hydroxy-i, j-dimethylcyclohexanecarboxylic and 3,4-dimethoxycyclohexanecarboxylic acids; together with trihydroxybenzene; methoxyhydroxybenzene and ethoxy phenyl-3-propanol (Tables 2 and 3).

Antimicrobial Activity

The activity on bacterial or fungal (yeast) strains isolated from biological samples from hospitalized or collection patients was evaluated, the nosocomial derivation of the majority of these strains characterized their resistance to different antimicrobials as reported in Tables 4 and 5.

In particular:

*Klebsiella pneumoniae*: represents the main opportunistic microorganism responsible for nosocomial infections and several authors report persistent biofilms of *K. pneumoniae* in water systems. A clinical isolate (NC5) was used to assess the actual resistance to the preparations [26].

*Escherichia coli*: the ATCC 7075 (American Type Culture Collection) strain was used.

*Staphylococcus aureus* Methicillin-resistantATCC BAA-811 is responsible for several suppurative infections in humans, it is often isolated in patients with prostheses.

*Pseudomonas aeruginosa*: in the present work a mucoid strain was tested (ATCC 15442) from the American Type Culture Collection (ATCC), known in the literature for its remarkable refractoriness to disinfectants, in particular if the strain is present in sessile form or in a state of mature biofilm.

https://www.lgcstandards-atcc.org/products/all/15442.aspx?geo_country=it [27]

Three azole-resistant clinical isolates belonging to the *Candida* genus were used, in particular: *C. albicans* clinical isolate BF1, *C. krusei* clinical isolate BF2 andclinical *C. glabrata*, isolate BF3 [1,26].

In all the tests performed, each microbial species was cultivated according to standard growth conditions, in particular:
1. Mueller-Hinton Agar medium (Microbiol, Uta, Cagliari), was used for the growth of *E. coli, S. aureus, P. aeruginosa* and *K. pneumoniae*. The development conditions were: in air at 37° C.
2. Schaedler Agar and Broth (Microbiol) medium was used for the growth of *S. pyogenes* and *S. mutans*. Development conditions: in air and 5% $CO_2$ at 37° C.
3. Sabouraud Dextrose Agar and Broth (Microbiol), used for *C. albicans, C. krusei* and *C. glabrata*. Development conditions: in air at 37° C.

All strains, belonging to the collection of the Molecular Biology laboratory, were stored at −80° C. in 2.5 mL Eppendorf microtubes, in the respective liquid culture media enriched in 15% glycerol to protect them from low temperatures. Each bacterium was contained in the tubes in the exponential growth phase, at a titer equal to $10^8$ CFU/mL (where CFU: Colony Forming Units). The inocula for the growth assays were made from these tubes, $10^6$ CFU/mL for bacteria and $10^5$ CFU/mL for yeasts.

In particular,were evaluated in vitro the following parameters, measured by standardized methods:
4. MIC (Minimum Inhibitory Concentration) or minimum inhibitory concentration: represents the minimum concentration of the preparation (highest dilution) capable of inhibiting bacterial or fungal growth of cells in suspension.
5. MBC (Minimum Bactericidal Concentration) or minimum bactericidal concentration: represents the lowest concentration (highest dilution) capable of killing the bacteria or fungi tested.
6. MBIC (Minimum Biofilm Inhibitory Concentration) represents the minimum concentration of the formulation needed to 99% inhibit the formation of a new microbial biofilm. The percentage of inhibition is calculated as follows:

PI %=($Bi$×100/$Ac$)−100

Where Ac represents the absorbance value at λ=600 nm of the positive control (untreated biofilm) and Bi that relating to the sample, after exposure to the formulation.

Operating Scheme

In preliminary form, an antimicrobial sensitivity test was performed on solid culture medium (agar) by means of the diffusion method in agar or the Kirby-Bauer method. In practice, for each formulation, 100 μL of solution were deposited in a well positioned in the center of a Petri dish, previously seeded with the pathogen under examination. After 24 h of incubation, the possible growth inhibition zone on the surface of the medium was evaluated (FIG. 4), the growth media used are those already indicated above and described in the standard protocols.

The Kirby-Bauer method, as structured, provided a non-definitive result of the antibacterial efficacy, that is an end-point and not a quantitative value.

In this context, it was subsequently necessary to evaluate a more sensitive dose-response system, that is, able to relate the time and concentration of the compound with the biological response. In the cells suspended in a special liquid medium, scalar concentrations of each preparation were tested. After a 24 h incubation, the presence/absence of microbial growth was evaluated based on the turbidity/clarity of the growth medium. Subcultures in agar medium were prepared from the suspensions in which complete inhibition of growth was observed, in order to evaluate the possible residual viability of the microorganism under examination.

For this purpose, scalar concentrations of each preparation were tested on a bacterial suspension equal to $10^6$ CFU/mL. After incubation in 96-well multi-well plates (Corning) for 48 h at 37° C., in the liquid media previously described for the various strains. The presence/absence of microbial growth was then evaluated on the basis of the turbidity/clarity of the growth medium, by reading with a spectrophotometer at a wavelength, 1, of 550 nm (SLT-Spectra II™, SLT Instruments, Germany). Subcultures in agar medium were prepared from the suspensions in which complete inhibition of growth was observed to evaluate the possible residual viability of the microorganism (MCB). As already described, the formulations under examination were tested at serial concentrations calculated according to the scheme [D=0.5 X], where D stands for dilution and X represents an integer between 1 and 10. The minimum concentration was evaluated for each formulation inhibitor (MIC) and minimal bactericidal concentration (MBC).

Evaluation of Antibiofilm Activity

In this assay, together with the parameters that evaluate the activity of an antimicrobial on microorganisms in suspended form (planktonic), we have introduced an evaluation which tends to measure the minimum biofilm inhibitory concentration (MBIC). It represents the lowest concentration of formulation (highest dilution) capable of inhibiting the structuring of the biofilm of a microorganism. The inhibition of the biofilm, for all strains, by the preparation was evaluated after 3 days of incubation in 96-well multi-well plates, using the same growth procedure for the suspension tests for the evaluation of the MIC. The residual biofilm was calculated using the method described by the "Center for Biofilm Engineering" (CBE) of the University of Montana (USA), http://www.biofilm.montana.edu/ [28].

The method involved: I) elimination of the supernatant, II) 2 washes in PBS buffer and III) subsequent staining of the wells with 0.3% Crystal Violet, IV) followed by 2 washes in PBS and V) subsequent addition of 200 mL of a aqueous solution 30% acetic acid. The amount of biofilm present in each well was evaluated by measuring absorbance at=620 nm in a multiplate reader (SLT-Spectra II™, SLT Instruments, Germany).

Statistical Analysis

The evaluation of experimental errors and uncertainty in the measurements of the microbial biofilm was performed following the procedure reported in our previous work [29]. In particular, both standard deviations and variances were taken into consideration in the spectrophotometric measurements, calculating for the same concentration of extract, the average of the absorbance values over at least 3 experimental replicates. In particular, thewas used F test to ascertain, for each microbe, at which concentration significant differences occur in the biological activity under examination [30]

Results Obtained

Figure 5:
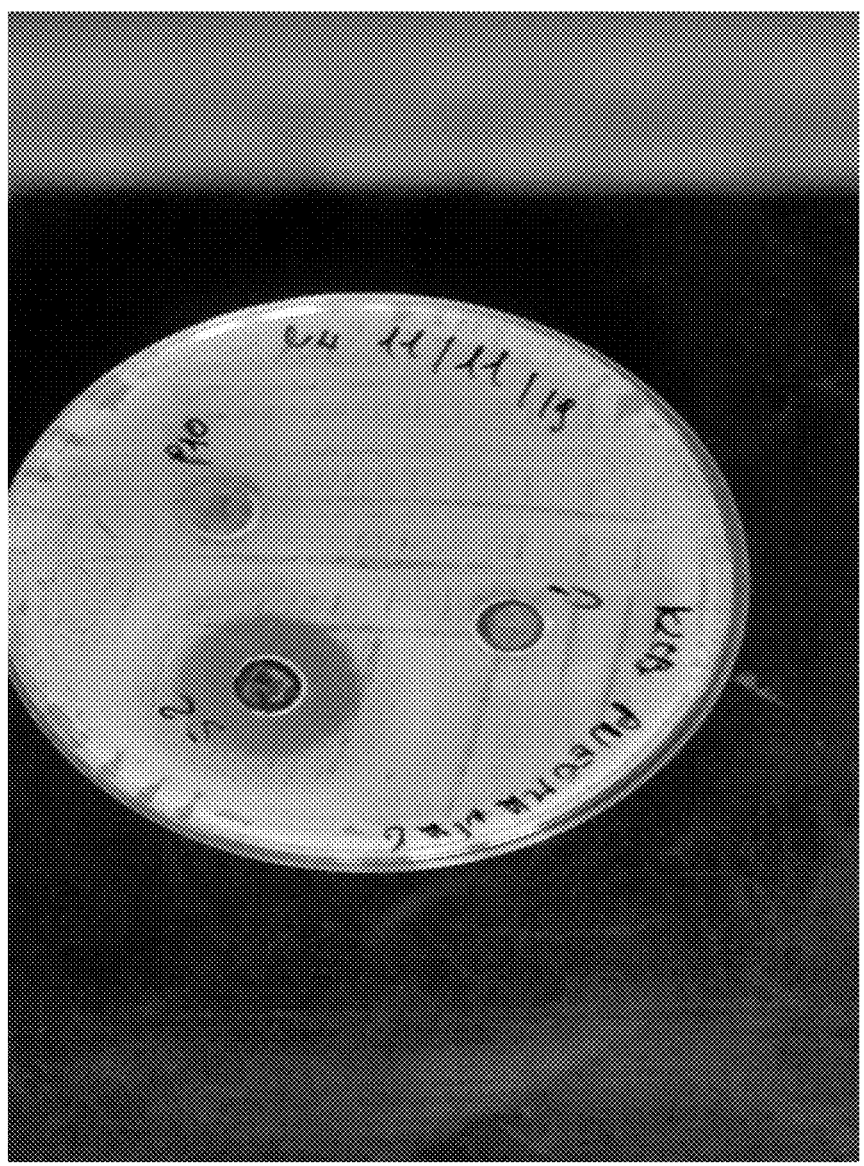
FIG. 5. Activity of the SFE extract conducted at 90 bar and 40° C. obtained from seeds of R. canina (S2) compared with the activity of the extracts obtained by maceration in methanol from the pulp of R. canina and removal of the solvent (sample P10).

As previously described, using the agar diffusion method (Kirby-Bauer), the preparation obtained by supercritical phase extraction compared with other extraction methods, was more active towards all the tested strains, as reported in Table 6 and FIG. 5.

The extract obtained by SFE has a broad spectrum of action for both Gram positive and Gram negative bacteria as well as blastomycetes (*Candida* spp.). The result suggests that the formulation under examination acts according to a mechanism of action independent of the structure of the cell wall or of the pathogenic species under examination; result shown also in FIG. 5 for *K. pneumoniae*.

The results obtained with the activity test in solid medium (Kirby-Bauer) were then confirmed with the assays in liquid medium designed to evaluate the MIC and MBC. In these trials additional pathogenic strains were also evaluated such as: *Streptococcus mutans, Candida krusei* and *C. glabrata*, Tables 7 and 8.

From the tables it is clear that the MIC and MBC values are rather low. In fact, these values (relative to the concentrations of extract in aqueous suspensions) are between (6.25 and 1.5)% (w/v) for the MICs, and in a range between (12.5 and 3.125)% (w/v) for the MBC.

Like the MIC and MBC values, the extract under examination has shown a strong ability to inhibit bacterial and fungal biofilms, with MBIC values ranging between (12.5 and 6.25)% (w/v) of extract. These results suggest a broad-spectrum use of the formulation, for products aimed at an industrial environment, eg. to eliminate/prevent contamination by *P. aeruginosa* in food industry plants, or as anticaries, in consideration of the remarkable activity shown against *S. mutans*.

Figure 6:
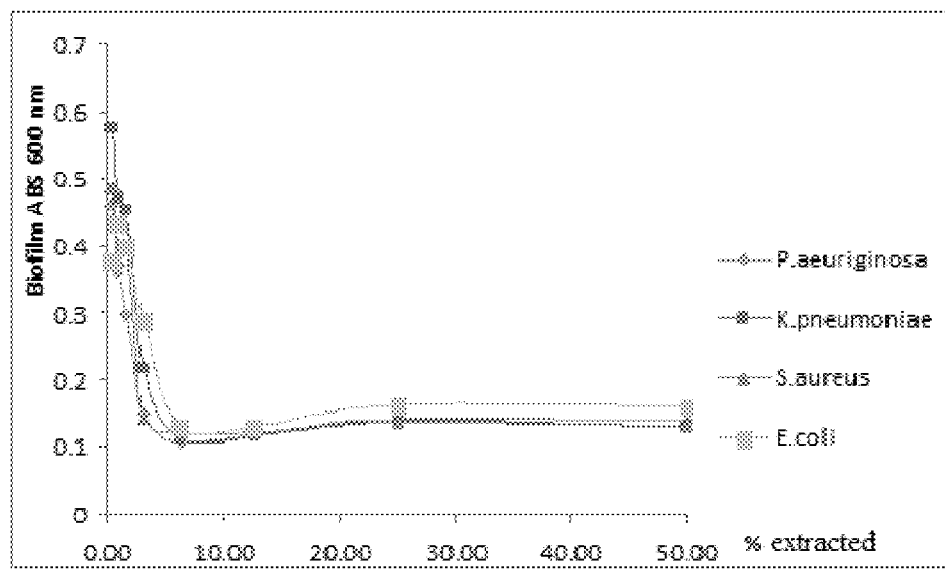
FIG. 6. Inhibition of biofilm formation for 4 bacterial species, one Gram positive (S. aureus) and three Gram negative (P. aeruginosa, K. pneumoniae, E. coli); MBIC was evaluated on aqueous solutions having a concentration of extract obtained by SFE, from seeds of Rosa canina (sample S2) equal to 6.25% (w/v).
Figure 7:
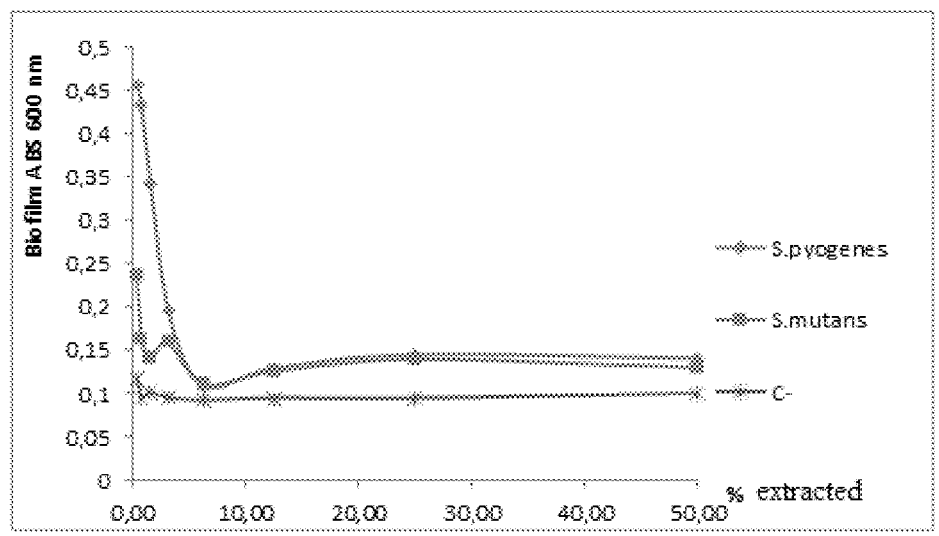
FIG. 7 Inhibition of biofilm S. pyogenes and S. mutans, MBIC was evaluated on aqueous solutions having a concentration of extract obtained by SFE, from seeds of Rosa canina (sample S2) equal to 6.25% (w/v), for both strains.
Figure 8:
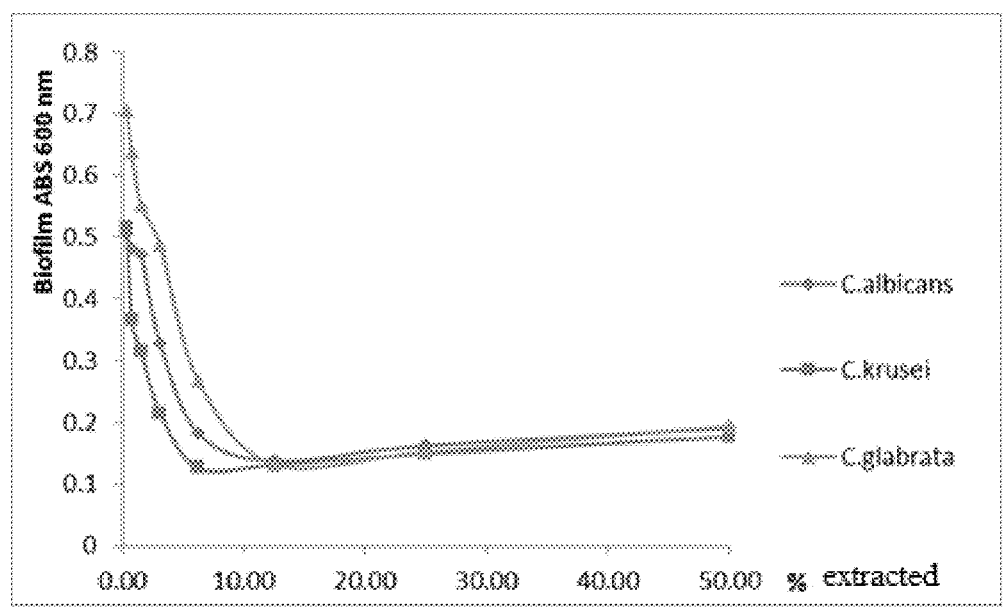
FIG. 8. Biofilm inhibition for three Candida spp.; the MBIC was evaluated on aqueous solutions having a concentration of extract obtained by SFE, from seeds of Rosa canina (sample S2) equal to 12.5% (w/v), for all strains.

The graphs in FIGS. 6-8 show the curves of inhibition in the formation of the biofilm in relation to the % concentration of the extract.

As Table 4 shows, the extracts obtained with procedures other than that of the invention proved to be less active.

TABLE 1

Composition percentage of the organic constituents of the extract, obtained by GC/MS. Retention times, $t_r$, experimental Kovats index, $I_{K\ (exp)}$, and literature, $I_{K(let)}$, name, brute formula and Chemical Abstract System number, CASNR, of the identified compound.

| $t_r$/min | $I_{K(exp)}$ | $I_{K(let)}$ | Compound-brute formula-CASNR | Composition % |
|---|---|---|---|---|
| 33.4531 | 1680 | 1677 | Apiole-$C_{12}H_{14}O_4$ CAS 523-80-8 | 1.1 |
| 41.8728 | 1926 | 1927 | Methyl palmitate-$C_{17}H_{34}O_2$ CAS 112-39-0 | 7.5 |
| 44.0367 | 1993 | 1993 | Ethyl palmitate-$C_{18}H_{36}O_2$ CAS 628-97-7 | 0.7 |
| 47.1536 | 2095 | 2092 | Methyl linoleate $C_{19}H_{34}O_2$ CAS 112-63-0 | 31.4 |
| 47.346 | 2101 | 2103 | Methyl oleate $C_{19}H_{36}O_2$ CAS 112-62-9 | 25.1 |

TABLE 1-continued

Composition percentage of the organic constituents of the extract, obtained by GC/MS. Retention times, $t_r$, experimental Kovats index, $I_{K\ (exp)}$, and literature, $I_{K(let)}$, name, brute formula and Chemical Abstract System number, CASNR, of the identified compound.

| $t_r$/min | $I_{K(exp)}$ | $I_{K(let)}$ | Compound-brute formula-CASNR | Composition % |
|---|---|---|---|---|
| 48.0804 | 2127 | 2128 | Methyl stearate $C_{19}H_{38}O_2$ CAS 112-61-8 | 3.6 |
| 48.7274 | 2149 |  | NI | 13.3 |
| 49.0815 | 2161 | 2159 | Ethyl linoleate $C_{20}H_{36}O_2$ CAS 544-35-4 | 4.7 |
| 49.2695 | 2168 | 2169 | Ethyl linoleate -$C_{20}H_{34}O_2$ CAS 1191-41-9 | 3.3 |
| 63.2804 | 2697 | 2700 | n-Heptacosane-$C_{27}H_{56}$ CAS 593-49-7 | 1.5 |
| 69.0290 | 2871 |  | NI | 1.2 |
| 69.8203 | 2891 |  | NI | 4.2 |
| 70.0432 | 2897 | 2900 | Nonacosane-$C_{29}H_{60}$ CAS 630-03-5 | 2.4 |

NI = Not Identified

TABLE 2

Brute formula of the deprotonated compound, [MH]−, molecular formula M, m/z ratio of the ion, experimental exact mass, theoretical exact mass and ppm error, related to the ESI-MS analysis, of the free fatty acids identified in extract object of the invention.

| Common name | [M − H]− | M | ion m/z ESI-MS | Exact experimental ion mass | Exact theoretical ion mass | Error ppm |
|---|---|---|---|---|---|---|
| Palmitic acid | $C_{16}H_{31}O_2$ | $C_{16}H_{32}O_2$ | 255 | 255.2319 | 255.2324 | 1.9 |
| Linolenic acid | $C_{18}H_{29}O_2$ | $C_{18}H_{30}O_2$ | 277 | 277.2165 | 277.2168 | 1.1 |
| Linoleic acid | $C_{18}H_{31}O_2$ | $C_{18}H_{32}O_2$ | 279 | 279.2316 | 279.2324 | 2.9 |
| Oleic acid | $C_{18}H_{33}O_2$ | $C_{18}H_{34}O_2$ | 281 | 281.2468 | 281.2480 | 4.3 |
| Stearic acid | $C_{18}H_{35}O_2$ | $C_{18}H_{36}O_2$ | 283 | 283.2625 | 283.2637 | 4.2 |

TABLE 3

Brute formula of deprotonated compound, [MH]−, protonated [M + H]+, of the adduct with the Na + ion [M + Na]+, molecular formula M, m/z ratio of the ion, exact experimental mass, theoretical exact mass and ppm error, relating to the ESI-MS analysis, of the compounds identified in the extract object of the invention.

| Name IUPAC | [M − H]− | [M + H]+ | [M + Na]+ | M | ion m/z ESI-MS | Exact mass experiment. ion | Exact theoretical ion mass | Error ppm |
|---|---|---|---|---|---|---|---|---|
| Benzoic acid | $C_7H_5O_2$ |  |  | $C_7H_6O_2$ | 121 | 121.0294 | 121.0290 | −3.3 |
| Trihydroxybenzene |  | $C_6H_7O_3$ |  | $C_6H_6O_3$ | 127 | 127.0382 | 127.0395 | 10 |
| Methoxyhydroxybenzene |  | $C_7H_9O_3$ |  | $C_7H_8O_3$ | 141 | 141.0538 | 141.0552 | 9.9 |
| Methoxyhydroxybenzene |  |  | $C_7H_8O_3Na$ | $C_7H_8O_3$ | 163 | 163.0357 | 163.0371 | 8.5 |
| Ethoxy phenyl-3-propanol |  | $C_{11}H_{17}O_2$ |  | $C_{11}H_{16}O_2$ | 181 | 181.1214 | 181.1228 | 7.7 |
| Ethoxy phenyl-3-propanol |  |  | $C_{11}H_{16}O_2Na$ | $C_{11}H_{16}O_2$ | 203 | 203.1032 | 203.1048 | 7.9 |
| Methoxybenzoic acid | $C_8H_7O_3$ |  |  | $C_8H_8O_3$ | 151 | 151.0397 | 151.0395 | −1.3 |
| 1-hydroxy-i, j-dimethylcyclohexane acid carboxylic | $C_9H_{15}O_3$ |  |  | $C_9H_{16}O_3$ | 171 | 171.1022 | 171.1021 | −0.5 |
| 3,4-Dimethoxy acid cyclohexanecarboxylic | $C_9H_{15}O_4$ |  |  | $C_9H_{16}O_4$ | 187 | 187.0972 | 187.0970 | −1 |

TABLE 4

Drug-resistance profile, towards different antibiotics, of the different bacterial strains examined.

| Antimicrobial | E. coli | S. aureus MRSA | S. pyogenes | P. aeruginosa* | K. pneumoniae |
|---|---|---|---|---|---|
| Amikacin | R | — | — | S | R |
| Amoxicillin/ac. Clavulanic | R | — | — | — | — |
| Benzylpenicillin | — | R | — | — | — |
| Cefepime | — | — | — | S | S |
| Cefotaxime | S | — | — | — | — |
| Ceftaroline | — | S | — | — | — |
| Ceftazidime | S | — | — | S | S |
| Ciprofloxacin | — | — | — | R | S |
| Clindamycin | — | S | S | — | — |
| Colistin | — | — | — | S | S |
| Daptomycin | — | S | — | — | — |
| Ertapenem | S | — | — | R | R |
| Erythromycin | — | R | S | — | — |
| Fosfomycin | — | — | — | R | S |
| Fusidic acid | — | S | S | — | — |
| Gentamicin | — | S | S | S | S |
| Imipenem | — | — | — | S | S |
| Levofloxacin | — | S | S | — | — |
| Linezolid | — | S | S | — | — |
| Meropenem | S | — | — | S | S |
| Oxacillin | — | S | R | — | — |
| Piperacillin-tazobactam | S | — | — | S | S |
| Rifampicin | — | S | S | — | — |
| Teicoplanin | — | S | — | — | — |
| Tetracycline | — | S | — | — | — |
| Tigecycline | — | S | S | — | — |
| Trimethoprim-sulfamethoxazole | — | S | R | R | R |
| Vancomycin | — | S | S | — | — |

R = resistant,
S = sensitive

TABLE 5

Drug-resistance profile of the different fungal strains (blastomycetes) examined.

| Antifungal | C. albicans | C. krusei | C. glabrata |
|---|---|---|---|
| Fluconazole (FLC) | R | R | R |
| Voriconazole (VRC) | R | R | R |
| Ketoconazole (KTC) | R | R | R |

Legend:
R = resistant,
S = sensitive
reference values
FLC: R > 64 µg/mL; DDS (16-32) µg/mL; S < 8 µg/mL;
VRC: R > 4 µg/mL; DDS 2 µg/mL; S < 1 µg/mL;
KTC: R > 1 µg/mL; DDS (0.25-0.50) µg/mL; S < 0.125 µg/mL.
(NCCLS, http://www.nccls.org/) [31].

TABLE 6

Average inhibition diameter of the SFE extract object of this patent proposal (S2) compared with other comparable extracts.

| Strain | Inhibition diameter/mm | | | | |
|---|---|---|---|---|---|
| | S2 | S3 | P5 | P9 | P10 |
| Candida albicans BF1 | 50 | 0 | 0 | 0 | 0 |
| Escherichia coli ATCC 7075 | 42 | 0 | 14 | 11 | 15 |
| Streptococcus pyogenes NC4 | 26 | 0 | 15 | 0 | 0 |
| Staphylococcus aureus ATCC BAA-811 | 37 | 14 | 0 | 0 | 0 |
| Pseudomonas aeruginosa ATCC 15442 | 37 | 0 | 0 | 0 | 15 |
| Klebsiella pneumoniae NC5 | 23 | 0 | 0 | 0 | 0 |

Legend:
| Code | Matrix/Methodical extraction/Type extract |
|---|---|
| S2 | Seeds of R. canine/SFE (90 bar; 40° C.)/Aqueous solution |
| S3 | Seeds of R. canine/extraction with n-hexane in Soxhlet and evaporation of solvent |
| P5 | Pulp R. canina/Maceration in water |
| P9 | Pulp of R. canina/Maceration in ethanol + ultrasound and solvent evaporation |
| P10 | Pulp of R. canina/Maceration in methanol + ultrasound and solvent evaporation |

TABLE 7

Profile of the minimum inhibitory concentrations (MIC) verified for the SFE extract (S2) against different microbial strains; the concentration represents the % weight/volume (w/v) of extract used in aqueous suspension.

| Strain | Concentration | | | | | | | |
|---|---|---|---|---|---|---|---|---|
| | 50 | 25 | 12.5 | 6.25 | 3.12 | 1.56 | 0.78 | 0.39 |
| Pseudomonas aeruginosa ATCC 15442 | NC | NC | NC | NC | NC | 1.56 | 0.78 | 0.39 |
| Klebsiella pneumoniae NC5 | NC | NC | NC | NC | NC | 1.56 | 0.78 | 0.39 |
| Staphylococcus aureus TCC BAA-811 | NC | NC | NC | NC | NC | 1.56 | 0.78 | 0.39 |
| Escherichia coli ATCC 7075 | NC | NC | NC | NC | NC | 1.56 | 0.78 | 0.39 |
| Streptococcus pyogenes NC4 | NC | NC | NC | NC | 3.12 | 1.56 | 0.78 | 0.39 |
| Streptococcus mutans CIP103220 | NC | NC | NC | NC | 3.12 | 1.56 | 0.78 | 0.39 |
| Candida albicans BF1 | NC | NC | NC | NC | 3.12 | 1.56 | 0.78 | 0.39 |
| Candida krusei BF2 | NC | NC | NC | NC | NC | NC | 0.78 | 0.39 |
| Candida glabrata BF3 | NC | NC | NC | NC | 3.12 | 1.56 | 0.78 | 0.39 |

NC = absence of growth

TABLE 8

Profile of the minimum bactericidal concentrations (MBC) verified for the SFE extract (S2) against different microbial strains; the concentration represents the % weight/volume (w/v) of extract used in aqueous suspension.

| Strain | Concentration | | | | | | | |
|---|---|---|---|---|---|---|---|---|
| | 50 | 25 | 12.5 | 6.25 | 3.12 | 1.56 | 0.78 | 0.39 |
| Pseudomonas aeruginosa ATCC 15442 | NC | NC | NC | NC | 3.12 | 1.56 | 0.78 | 0.39 |
| Klebsiella pneumoniae NC5 | NC | NC | NC | NC | 3.12 | 1.56 | 0.78 | 0.39 |
| Staphylococcus aureus ATCC BAA-811 | NC | NC | NC | NC | NC | 1.56 | 0.78 | 0.39 |
| Escherichia coli ATCC 7075 | NC | NC | NC | 6.25 | 3.12 | 1.56 | 0.78 | 0.39 |
| Streptococcus pyogenes NC4 | NC | NC | NC | NC | 3.12 | 1.56 | 0.78 | 0.39 |
| Streptococcus mutans CIP103220 | NC | NC | NC | NC | 3.12 | 1.56 | 0.78 | 0.39 |
| Candida albicans BF1 | NC | NC | NC | NC | 3.12 | 1.56 | 0.78 | 0.39 |
| Candida krusei BF2 | NC | NC | NC | NC | 3.12 | 1.56 | 0.78 | 0.39 |
| Candida glabrata BF3 | NC | NC | NC | NC | 3.12 | 1.56 | 0.78 | 0.39 |

NC = absence of growth

BIBLIOGRAPHY

2. Di Petrillo A, Fais A, Pintus F, Santos-Buelga C, González-Paramás A M, Piras V, Orrù G, Mameli A, Tramontano E, Frau A. (2017). Broad-range potential of *Asphodelus microcarpus* leaves extract for drug development. BMC Microbiol, 17(1):159.
2. Eichenberger, E. M., & Thaden, J. T. (2019). Epidemiology and mechanisms of resistance of extensively drug resistant Gram-negative bacteria. Antibiotics, 8(2), 37.
3. Schwartz, K. L., & Morris, S. K. (2018). Travel and the spread of drug-resistant bacteria. Current infectious disease reports, 20(9), 29.
4. El Chakhtoura, N. G., Saade, E., Iovleva, A., Yasmin, M., Wilson, B., Perez, F., & Bonomo, R. A. (2018). Therapies for multidrug resistant and extensively drug-resistant non-fermenting gram-negative bacteria causing nosocomial infections: a perilous journey toward 'molecularly targeted' therapy. Expert review of anti-infective therapy, 16(2), 89-110.
5. Christaki, E., Marcou, M., & Tofarides, A. (2020). Antimicrobial resistance in bacteria: mechanisms, evolution, and persistence. Journal of molecular evolution, 88(1), 26-40.
6. Maddox, C. E., Laur, L. M., & Tian, L. (2010). Antibacterial activity of phenolic compounds against the phytopathogen *Xylella fastidiosa*. Current microbiology, 60(1), 53.
7. Wright, E. A., Di Lorenzo, V., Trappetti, C., Liciardi, M., Orru, G., Viti, C., . . . & Winstanley, C. (2015). Divergence of a strain of *Pseudomonas aeruginosa* during an outbreak of ovine mastitis. Veterinary microbiology, 175(1), 105-113.
8. Khameneh, B., Iranshahy, M., Soheili, V., & Bazzaz, B. S. F. (2019). Review on plant antimicrobials: A mechanistic viewpoint. Antimicrobial Resistance & Infection Control, 8(1), 118.
9. Singh, P. A., Desai, S. D., & Singh, J. (2018). A review on plant antimicrobials of past decade. Current Topics in Medicinal Chemistry, 18(10), 812-833.
10. Arceusz, A., Wesolowski, M., & Konieczynski, P. (2013). Methods for extraction and determination of phenolic acids in medicinal plants: a review. Natural product communications, 8(12), 1934578X1300801238.
11. Li, H. B., Jiang, Y., Wong, C. C., Cheng, K. W., & Chen, F. (2007). Evaluation of two methods for the extraction of antioxidants from medicinal plants. Analytical and Bioanalytical Chemistry, 388(2), 483-488.

12. Marongiu, B., Porcedda, S., Piras, A., & Falconieri, D. (2012). Capitolo 2 Traditional and modern methods for the preparation of essential oils. In In: Essential Oils as Natural Food Additives. Editor: Luca Valgimigli. ISBN 978-1-62100-241-3. Nova Science Publishers, Inc.
13. Schantz, M. M., Bøwadt, S., Benner Jr, B. A., Wise, S. A., & Hawthorne, S. B. (1998). Comparison of supercritical fluid extraction and Soxhlet extraction for the determination of polychlorinated biphenyls in environmental matrix standard reference materials. Journal of Chromatography A, 816(2), 213-220.
14. Trusheva, B., Trunkova, D., & Bankova, V. (2007). Different extraction methods of biologically active components from propolis: a preliminary study. Chemistry Central Journal, 1(1), 13.
15. Kaufmann, B., & Christen, P. (2002). Recent extraction techniques for natural products: microwave-assisted extraction and pressuried solvent extraction. Phytochemical Analysis: An International Journal of Plant Chemical and Biochemical Techniques, 13(2), 105-113.
16. Szentmihályi, K., Vinkler, P., Lakatos, B., Illés, V., & Then, M. (2002). Rose hip (Rosa canina L.) oil obtained from waste hip seeds by different extraction methods. Bioresource technology, 82(2), 195-201.
17. Taneva, S., Konakchiev, A., Totzeva, I., Kamenova-Nacheva, M., Nikolova, Y., Momchilova, S., & Dimitrov, V. (2017). Super-critical carbon dioxide extraction as an effective green technology for production of high quality rose hip oil. Bulgarian Chemical Communications, 49, 126-131.
18. Rebolleda, S., Rubio, N., Beltrán, S., Sanz, M. T., & González-Sanjosé, M. L. (2012). Supercritical fluid extraction of corn germ oil: Study of the influence of process parameters on the extraction yield and oil quality. The Journal of Supercritical Fluids, 72, 270-277.
19. Soo, Y. T., Waled, S. N. M. B., Ng, S., Peh, Y. H., & Chew, K. L. (2020). Evaluation of EUCAST rapid antimicrobial susceptibility testing (RAST) directly from blood culture bottles. European Journal of Clinical Microbiology & Infectious Diseases, 1-6.
20. European Committee for Antimicrobial Susceptibility Testing of the European Society of Clinical M, Infectious D: EUCAST Definitive Document E.DEF 3.1, June 2000: Determination of minimum inhibitory concentrations (MICs) of antibacterial agents by agar dilution. Clinical microbiology and infection: the official publication of the European Society of Clinical Microbiology and Infectious Diseases 2000, 6(9):509-515.
21. DAS, Undurti N. (2020). Can Bioactive Lipids Inactivate Coronavirus (COVID-19)?. *Archives of medical research*.
22. Thormar, H., Isaacs, C. E., Brown, H. R., Barshatzky, M. R., & Pessolano, T. (1987). Inactivation of enveloped viruses and killing of cells by fatty acids and monoglycerides. *Antimicrobial agents and chemotherapy*, 31(1), 27-31.
23. Agarwal, H. K., Chhikara, B. S., Hanley, M. J., Ye, G., Doncel, G. F., & Parang, K. (2012). Synthesis and biological evaluation of fatty acyl ester derivatives of (−)-2′, 3′-dideoxy-3′-thiacytidine. *Journal of medicinal chemistry*, 55(10), 4861-4871.
24. Garcia-Oliveira, P., Fraga-Corral, M., Pereira, A. G., Lourenço-Lopes, C., Jimenez-Lopez, C., Prieto, M. A., & Simal-Gandara, J. (2020). Scientific Basis for the Industrialization of Traditionally Used Plants of the Rosaceae Family. Food Chemistry, 127197.
25. Barberis, A., Deiana, M., Spissu, Y., Azara, E., Fadda, A., Serra, P. A., ... & Scano, A. (2020). Antioxidant, antimicrobial, and other biological properties of Pompia juice. Molecules, 25(14), 3186.
26. Pintus A, Aragoni M C, Cinellu M A, Maiore L, Isaia F, Lippolis V, Orrù G, Tuveri E, Zucca A, Arca M. (2017). [Au(pyb-H)(mnt)]: A novel gold(III) 1,2-dithiolene cyclometalated complex with antimicrobial activity (pyb-H═C-deprotonated 2-benzylpyridine; mnt=1,2-dicyanoethene-1,2-dithiolate). J Inorg Biochem. 170:188-194.
27. https://www.lgcstandards-atcc.org/products/all/15442.aspx?geo_country=it
28. http://www.biofilm.montana.edu/.
29. Manca, M. L., Usach, I., Peris, J. E., Ibba, A., Orrù, G., Valenti, D., ... & Manconi, M. (2019). Optimization of Innovative Three-Dimensionally-Structured Hybrid Vesicles to Improve the Cutaneous Delivery of Clotrimazole for the Treatment of Topical Candidiasis. Pharmaceutics, 11(6), 263.
30. Podda, E., Arca, M., Atzeni, G., Coles, S. J., Ibba, A., Isaia, F., ... & Tuveri, E. (2020). Antibacterial Activity of Amidodithiophosphonato Nickel (II) Complexes: An Experimental and Theoretical Approach. Molecules, 25(9), 2052.
31. http://www.nccls.org/

The invention claimed is:

1. An aqueous extract obtained from seeds of *Rosa canina* by an extraction with a supercritical $CO_2$, wherein the aqueous extract is obtained from a process comprising:
   (I) extracting dried and ground seeds of *Rosa canina* with $CO_2$ in a supercritical phase as an extraction solvent under conditions of: a pressure ≤100 bar, a temperature ≤60° C., an extraction time ≤8 h, and a relative quantity of the extraction solvent ($m_s/m_0$) between 5 and 40, wherein $m_s/m_0$ is a total mass of the extraction solvent ($m_s$) divided by a matrix mass subjected to an extraction ($m_0$);
   (II) separating the extract obtained in (I) from the extraction solvent at a pressure ≤20 bar and a temperature ≤40° C.;
   (III) bringing the extract obtained in (II) to room temperature and pressure so that the extract spontaneously separates into two liquid phases: an oily phase and an aqueous phase; and
   (IV) recovering the aqueous phase in (III) in order to obtain the aqueous extract;
wherein the aqueous extract has a dry fraction ranging between 0.1 and 10% mass/mass, and the aqueous extract comprises one or more organic compounds selected from: methyl-linoleate, methyl-oleate, methyl-palmitate, ethyl-linoleate, and ethyl-linolenate.

2. The aqueous extract according to claim 1, wherein the aqueous extract comprises: 31.4% of the methyl-linoleate, 25.1% of the methyl-oleate, 7.5% of the methyl-palmitate, 4.7% of the ethyl-linoleate, and 3.3% of the ethyl-linolenate.

3. The aqueous extract according to claim 1, further comprising one or more compounds selected from: apiol, palmitic acid, linolenic acid, linoleic acid, oleic acid, stearic acid, benzoic acid, methoxybenzoic acid, 1-hydroxy-i, j-dimethyl-cyclohexanecarboxylic acid, 3,4-dimethoxycyclohexanecarboxylic acid, trihydroxybenzene; methoxydihydroxybenzene, and ethoxy phenyl-3-propanol.

4. The aqueous extract according to claim 1, wherein the aqueous extract has an MIC (Minimum Inhibitory Concentration) with values in a range between 6.25% and 1.56% weight/volume and an MBC (Minimum Bactericidal Concentration) with values in a range between 12.5% and 3.12% against fungi and bacteria.

5. The aqueous extract according to claim 1, wherein the aqueous extract has an MBIC (Minimum Biofilm Inhibitory Concentration) with values between 12.5% and 6.25% weight/volume of an inhibition of microbial biofilms.

6. The aqueous extract according to claim 1, wherein the aqueous extract is configured for cosmetic use.

7. The aqueous extract according to claim 1, wherein the aqueous extract is configured for use in a medical field.

8. The aqueous extract according to claim 1, wherein the aqueous extract is configured for use in a phytopharmaceutical field.

9. The aqueous extract according to claim 1, wherein the aqueous extract is configured for use as a disinfectant, an antibacterial, an antifungal, an antibiofilm and/or an antimicrobial.

10. The aqueous extract according to claim 1, wherein the aqueous extract is configured for topical use at a cutaneous and/or mucosal level.

11. The aqueous extract according to claim 1, wherein the aqueous extract is configured for use in a control and elimination of pathogens, wherein the pathogens comprise Gram positive bacteria, Gram negative bacteria, pathogenic streptococci, antibiotic multidrug-resistant pathogens (MDR), nosocomial clinical isolates, azole multidrug-resistant clinical isolates, and/or viruses.

12. The aqueous extract according to claim 11, wherein the pathogens are selected from: *Escherichia coli, Escherichia coli* ATCC 7075, *Pseudomonas aeruginosa, Pseudomonas aeruginosa* ATCC15442 (mucoid strain, clinical nosocomial isolate), *Klebsiella pneumoniae, Klebsiella pneumoniae* NC5 (clinical nosocomial isolate), *Staphylococcus aureus, Staphylococcus aureus* Methicillin-resistant ATCC BAA-811 (MSRA), *Streptococcus intermedius, Streptococcus pyogenes, Streptococcus pyogenes* NC4, *Streptococcus mutans, Streptococcus mutans* CIP103220, *Candida albicans, Candida Krusei, Candida glabrata*, clinical isolates of *Candida albicans* BF1, *Candida krusei* BF2, *Candida glabrata* BF3, multiresistant azoles and/or Sars-CoV-2.

13. A method of using the aqueous extract according to claim 1 as a disinfectant and antimicrobial agent against a transmission of nosocomial cross-infections, for domestic health and hygiene, comprising a step of applying the aqueous extract to instruments, surfaces and fluids in: a commercial environment, an industrial environment, a community environment, a hospital ward, a hotel, an airport, a school, a doctor's office, a dental office, a pre-operative setting, surgical instruments, water in dental units, air in aeration/conditioning systems, an automatic device, and a nebulizer.

14. A method of using the aqueous extract according to claim 1 in a veterinary field, comprising a step of applying the aqueous extract in gelled preparations, liquid preparations and nebulized preparations to: a skin disinfection in farm animals, a skin disinfectant in pet animals, a treatment of cutaneous mycosis, an eradication treatment of pathogenic bacteria, or disinfect milking systems.

15. A method of using the aqueous extract according to claim 1 in an agri-food sector, comprising a step of applying the aqueous extract to an environment or equipment for; a treatment of diseases of plants in cultivation, a treatment of diseases in ornamental plants, disinfection in a packaging industry of fresh food products, or disinfection in a packaging industry of persevered food products.

16. A composition, comprising the aqueous extract according to claim 1.

17. The composition according to claim 16, wherein the composition is a cosmetic composition.

18. The composition according to claim 16, wherein the composition is a disinfectant composition.

19. The composition according to claim 16, wherein the composition is a disinfectant composition, a surface composition, a topical composition, or a mucosal composition.

20. The composition according to claim 16, wherein the composition is a disinfectant composition for humans, animals and/or plants.

21. The composition according to claim 16, wherein the composition is a composition formulated in a form of a solid, a liquid a semi-liquid, a gel, a liposomal formulation, a cream, a paste, a lotion, a soap, a suspension, a milk, a spray, a functional base, mouthwashes and/or toothpastes.

22. The composition according to claim 16, further comprising cosmetically and pharmaceutically acceptable adjuvants and carriers, wherein the cosmetically and pharmaceutically acceptable adjuvants and carriers comprise single and multi-lamellar liposomes.

23. The composition according to claim 16, wherein the composition is configured for a use in a medical field.

24. The composition according to claim 16, wherein the composition is configured for a use in a phytopharmaceutical field.

25. The composition according to claim 16, wherein the composition is configured for a use as a disinfectant, an antibacterial, an antifungal, an antibiofilm and/or an antimicrobial.

26. The composition according to claim 16, wherein the composition is configured for a topical use at a cutaneous and mucosal level.

27. The composition according to claim 16, wherein the composition is configured for use in a control and elimination of pathogens, wherein the pathogens comprise Gram positive bacteria, Gram negative bacteria, pathogenic streptococci, antibiotic multidrug-resistant pathogens (MDR), nosocomial clinical isolates, azole multidrug-resistant clinical isolates, and/or viruses.

28. The composition according to the claim 27, wherein the pathogens are selected from: *Escherichia coli, Escherichia coli* ATCC 7075, *Pseudomonas aeruginosa, Pseudomonas aeruginosa* ATCC15442 (mucoid strain, clinical nosocomial isolate), *Klebsiella pneumoniae, Klebsiella pneumoniae* NC5 (clinical nosocomial isolate), *Staphylococcus aureus, Staphylococcus aureus* Methicillin-resistant ATCC BAA-811 (MSRA), *Streptococcus intermedius, Streptococcus pyogenes, Streptococcus pyogenes* NC4, *Streptococcus mutans, Streptococcus mutans* CIP103220, *Candida albicans, Candida Krusei, Candida glabrata*, clinical isolates of *Candida albicans* BF1, *Candida krusei* BF2, *Candida glabrata* BF3, multiresistant azoles and/or Sars-CoV-2.

29. The composition according to claim 16, wherein the composition is configured for use in a treatment of diseases of an oral cavity comprising caries, peri-implantitis and periodontitis.

30. A method of using the aqueous extract according to claim 16 as a disinfectant and antimicrobial agent against a transmission of nosocomial cross-infections, for domestic health and hygiene, comprising a step of applying the aqueous extract to instruments, surfaces and fluids in: a commercial environment, an industrial environment, a community environment, a hospital ward, a hotel, an airport, a school, a doctor's office, a dental office, a pre-operative setting, surgical instruments, water in dental units, air in aeration/conditioning systems, an automatic device, and a nebulizer.

31. A method of using the aqueous extract according to claim 16 in a veterinary field, comprising a step of applying the aqueous extract in gelled preparations, liquid preparations and nebulized preparations to: a skin disinfection in farm animals, a skin disinfectant in pet animals, a treatment of cutaneous mycosis, an eradication treatment of pathogenic bacteria, or disinfect milking systems.

32. A method of using the aqueous extract according to claim 16 in an agri-food sector, comprising a step of applying the aqueous extract to an environment or equipment for; a treatment of diseases of plants in cultivation, a treatment of diseases in ornamental plants, disinfection in a packaging industry of fresh food products, or disinfection in a packaging industry of persevered food products.

33. An extraction process of a plant matrix consisting of seeds of Rosa canina, comprising the following steps:
   (I) extracting dried and ground seeds of *Rosa canina* with $CO_2$ in a supercritical phase as an extraction solvent under conditions of: a pressure $\leq 100$ bar, a temperature $\leq 60°$ C., an extraction time $\leq 8$ h, and a relative quantity of the extraction solvent ($m_s/m_0$) between 5 and 40, wherein $m_s/m_0$ is a total mass of the extraction solvent ($m_s$) divided by a matrix mass subjected to an extraction ($m_0$);
   (II) separating the extract obtained in (I) from the extraction solvent at a pressure $\leq 20$ bar and a temperature $\leq 40°$ C.;
   (III) bringing the extract obtained in (III) to room temperature and pressure so that the extract spontaneously separates into two liquid phases: an oily phase and an aqueous phase;
   (IV) recovering the two liquid phases obtained in (III).

34. The extraction process according to claim 33, wherein the extracting is carried out at a pressure between 80 and 100 bar, at a temperature between 40 and 60° C., for an extraction time between 2 and 8 h; and the separating is carried out at a pressure between 5 and 20 bar and at a temperature between 5 and 40° C.

35. The extraction process according to claim 33, wherein the recovering of the two liquid phases is carried out by a decantation with cooling or by centrifugation.

36. A method of using the aqueous phase obtained in the extraction process according to claim 33, wherein the aqueous phase is incorporated into a disinfectant and/or an antibacterial composition.

37. A method of using the oily phase obtained in the extraction process according to claim 33, wherein the oily phase is incorporated into a cosmetic composition.

* * * * *